United States Patent [19]
Norrell

[11] 4,079,297
[45] Mar. 14, 1978

[54] OPEN LOOP FACSIMILE PHASING SYSTEM AND METHOD

[75] Inventor: Donald L. Norrell, Woodbury, Minn.

[73] Assignee: Minnesota Mining and Manufacturing Company, St. Paul, Minn.

[21] Appl. No.: 752,533

[22] Filed: Dec. 20, 1976

[51] Int. Cl.² .......................................... H02K 37/00
[52] U.S. Cl. ..................................... 318/85; 318/696
[58] Field of Search .................. 318/85, 41, 696, 685, 318/138

[56] References Cited
U.S. PATENT DOCUMENTS

| | | | |
|---|---|---|---|
| 3,553,370 | 1/1971 | Rosenheck | 178/69.5 |
| 3,746,957 | 7/1973 | Forster et al. | 318/85 |
| 3,923,147 | 12/1975 | Quinn | 318/85 |

*Primary Examiner*—Herman J. Hohauser
*Attorney, Agent, or Firm*—Cruzan Alexander; Donald M. Sell; Robert L. Marben

[57] ABSTRACT

A method and system for altering the phase difference between a local motor and a remote motor wherein the phase difference is determined in terms of a count made of reference pulses at a first frequency when both motors are operating at a predetermined speed that is directly related to the first frequency. A phase altering count is determined from the phase difference count indicative of the degree to which the phase difference is to be altered and the reference pulses are produced at the local motor at a second frequency to alter the speed of the local motor. The phase altering count and the reference pulses at the second frequency are used to establish a time interval for operation of the stepping motor sufficient to make the desired change in the phase difference.

31 Claims, 11 Drawing Figures

OPEN LOOP FACSIMILE PHASING SYSTEM AND METHOD

BACKGROUND OF THE INVENTION

1. Field of the Invention

This invention relates to an open loop system and method for altering the angular position of a stepping motor with respect to a second motor and, in particular, to facsimile systems requiring the phasing of a motor at one location with respect to a motor at another location.

2. Prior Art

A facsimile system generally comprises a facsimile transmitter station for generating signals derived from a scan of a document, a receiver station at another location for forming a reproduction of the document in accordance with the sigals received from the transmitter, and a communication channel joining the two stations.

In the case of a rotary drum facsimile system, the document to be scanned is mounted on a rotating motor driven drum at the transmitter while a copy sheet is mounted on a similar rotating motor driven drum at the receiver. The document and the copy sheet must have essentially the same angular orientation with respect to a common reference when the drums are rotating to ensure that the reproduction starts at approximately the same lateral position on the copy sheet as the image on the original document. The alignment of the angular positions of the motors and, therefore, the drums is referred to herein as "phasing" or "phase synchronization."

Facsimile systems are known which have conventional pulse generating means for providing signals indicating the relative positions of the transmitting drum and the receiving drum. The transmitter is arranged to generate a phasing pulse for each revolution of its drum with the receiver for a system generating a similar phasing pulse for each revolution of its drum. The time spacing between the phasing pulse from the transmitter and the phasing pulse from the receiver or vice versa is a function of the displacement from the desired phase relationship. Coincidental pulses or pulses having a predetermined time displacement indicate the in-phase relation of the transmitter and receiver drums.

U.S. Pat. No. 3,553,370 to Bernard M. Rosenheck discloses an open loop phasing system for a facsimile transmitter and receiver which utilizes such phasing pulses to control a pulse counter to obtain a count representing the phase difference or phase error between the rotating drums of the transmitter and receiver. The count, when initiated by a phasing pulse from the receiver, represents the amount the receiver drum leads the transmitter drum. The count is obtained at a frequency which is directly proportional to the speed of rotation of the transmitting and receiving drums. The counter is set for a predetermined count corresponding to the count pulses that would be applied during the time interval of one revolution of the drum. The predetermined count minus the count obtained represents the amount by which the receiver drum lags the transmitter drum. After the count representing the phase error is obtained, the count is continued at a lower frequency until the predetermined count is reached. The count pulses provided at the lower frequency are also applied to operate a phase correction device at the same time, so that the phase correction is completed when the counter reaches its predetermined count. The phase correction device is a stepping motor which is connected to rotate the stator of the drive motor for the receiving drum. This causes the rotor to be offset in the direction of rotation and by the additional amount of stator rotation for advancing the receiver and correcting the degree to which it lags the transmitter.

While this prior art arrangement provides for an open loop phasing system, it requires an additional motor and coupling to the stator of the receiver motor to effect the phase correction.

SUMMARY OF THE INVENTION

The present invention avoids the need for a separate motor and coupling to the stator of the receiver drum motor to make the phase correction and provides a method and system which can be implemented by programming a programmable microprocessor which is also usable for controlling other functions required by the facsimile system. The method of this invention for altering the phase difference between two motors, such as the transmitter drum motor and the receiver drum motor of a facsimile system, utilizes a first signal which represents the angular position of one of the motors when rotating at a predetermined speed with a second signal provided representing the angular position of the other motor while it is also rotating at the predetermined speed to provide a measure of the phase difference between the two motors in terms of a count indicative of reference pulses provided at a first frequency between the occurrence of one of the first and second signals and the subsequent occurrence of the other of the first and second signals, and includes the steps of providing a stepping motor as one of the motors; producing drive pulses for the stepping motor at a frequency which is directly related to the frequency of the reference pulses for driving the stepping motor; determining a phase altering count from the phase difference count which is indicative of the degree to which the phase difference is to be altered; providing the reference pulses at a second frequency after the phase difference count is completed; and using such phase altering count and the reference pulses at the second frequency for establishing the operation of said stepping motor for a time interval during which the difference between the number of the reference pulses at the first frequency that could have been produced during said time interval and the number of the reference pulses provided at the second frequency during said time interval is equal to the phase altering count.

The phase altering count may be selected to be the count made of the phase difference so that full correction of the phase difference is completed at the end of the time interval during which the stepping motor is operated using drive pulses produced at a frequency that is directly related to the second frequency. If the phase altering count is determined when viewing the stepping motor as leading the other motor, the stepping motor is operated at a slower speed than the other motor for the time interval mentioned with a higher speed than the other motor being provided for the time interval mentioned when the phase altering count is determined when viewing the stepping motor as lagging the other motor.

The time interval for operation of the stepping motor required for a selected phase altering count can be established by providing a control count based on the phase altering count, operating the stepping motor at a speed determined by drive pulses produced at a frequency directly related to reference pulses provided at a second frequency that is F times the first frequency with count pulses provided that are based on the second frequency until the number of such count pulses is equal to the control count such that the relationship $N_p = (F/|1-F|) N$ is satisfied, where $N_p$ is the number of pulses produced at the second frequency for the time interval, F is a number other than unity, and N is the selected phase altering count. For example, the control count based on the phase altering count could be $(F/|1-F|) N$ requiring $N_p$ pulses to be produced as count pulses equal to $(F/|1-F|) N$ to establish the phasing time interval. Similarly, the control count could be selected as N, the phase altering count. The phasing time interval is then established when N count pulses, obtained by dividing the $N_p$ (pulses at the second frequency) by $(F/|1-F|)$, have been produced while the stepping motor is operated at a speed determined by drive pulses provided at the second frequency. Other possible arrangements providing other multipliers and divisors will result; for example, if both sides of the equation $N_p = (F/|1-F|) N$ are multiplied by a constant or if F is selected whereby $(F/|1-F|)$ is a fraction, e.g., 7/2, in which case, the phase altering count (N) could be multiplied by 7 to establish the control count, while the count pulses based on the pulses at the second frequency could be obtained by multiplying the pulses provided at the second frequency by 2.

If desired, the method permits the phase difference to be corrected by dividing the phase difference count into two or more phase altering counts and applying the above method to each phase altering count. Accordingly, the correction of the phase difference can be carried out using more than one speed for the stepping motor.

One system embodying the invention for altering the phase difference between two motors wherein a first signal is provided representing the angular position of one of said motors when rotating at a predetermined speed with a second signal provided representing the angular position of the other of said motors while it is rotating at the predetermined speed comprises a stepping motor as one of the motors; pulse producing means selectively operable for providing reference pulses at a first frequency and at least one other frequency; means connected to the pulse producing means and the stepping motor for providing drive pulses for the stepping motor at a frequency directly related to the frequency of the reference pulses provided by the pulse producing means, the drive pulses providing operation of the stepping motor at the predetermined speed when the pulse producing means is providing reference pulses at said first frequency; and control means connected for selectively controlling the pulse producing means for providing reference pulses at the first frequency and connected to receive the first and second signals for providing a phase difference count that is a count indicative of the reference pulses that are provided at said first frequency between the occurrence of one of the first and second signals and the subsequent occurrence of the other of the first and second signals, said control means providing a phase altering count based on said phase difference count and responding to the phase altering count for selectively controlling pulse producing means for a time interval during which said control means controls the pulse producing means to provide reference pulses, other than that at said first frequency, such that the difference between the number of reference pulses at said first frequency that could have been produced during the time interval and the number of reference pulses provided during the time interval is equal to said phase altering count.

The control means for the system that will provide the necessary time interval may include a multiplier and/or divider means for operating on the phase altering count to provide a control count, with the control means responding to the second signal to select the operation of the pulse producing means to provide the reference pulses at a second frequency that is F times the first frequency, where F is a number other than unity, said control means including multiplier and/or divider means for operating on the reference pulses provided at said second frequency to provide count pulses until the number of said count pulses is equal to said control count obtained from the phase altering count, wherein said control count and count pulses are based on the relationship $N_p = (F/|1-F|) N$, where N is the phase altering count and $N_p$ is the number of pulses produced at the second frequency. For example, the multiplier and/or divider means can multiply the phase altering count by $(F/|1-F|)$ to establish the number of reference pulses at the second frequency as count pulses that are required to establish the time interval. F is selected to be less than unity when the phase altering count is determined by the system viewing the stepping motor as leading the other motor and is selected to be greater than unity when the phase altering count is determined by the system viewing the stepping motor as lagging the other motor.

DETAILED DESCRIPTION OF THE INVENTION

An understanding of the present invention may be obtained by an initial consideration of the various factors which are involved in altering the phase difference that may exist between two motors when each is operating at a predetermined speed. One basic aspect of the invention requires measurement of the phase difference when the motors are operating at such predetermined speed and in terms of a count made of reference pulses provided at a first frequency that is directly related to the predetermined speed of the motors. Another fundamental aspect of this invention is the requirement that the speed of one of the motors when making the desired phase alteration be directly related to reference pulses that are then provided at a second frequency with such second frequency being equal to the first frequency times F, when F is a number other than unity.

For purposes of this explanation, a motor used to drive the drum at the remote station of a rotary drum facsimile system is considered as one motor (not shown) with the motor for the drum at the local station of such a system as the second motor with such motor being a stepping motor. It is also assumed that the phase difference count is obtained in a manner such that it indicates the degree to which the local motor leads the remote motor. The phase difference count N is made using reference pulses of a first frequency which is directly related to the speed of the two motors when making the phase difference measurement. Since the local motor leads the remote motor by the phase count N, the local motor can be reduced in speed for a time interval, referred to herein as the phasing time interval, $T_p$, sufficient to alter the phase difference a desired amount or reduce it to zero. Since the local motor is a stepping motor, the distance it travels at its phasing speed, $S_p$, during the phasing time interval, $T_p$, is $S_p T_p$. The remote motor will be traveling at the speed, $S_c$, which is the same speed used when making the phase difference count, so during the phasing time interval, it travels a distance $S_c T_p$. If the phase difference is to be reduced to zero, $S_c T_p - S_p T_p$ is directly related to the phase correction or the phase difference count N. $S_c T_p$ and $S_p T_p$ can be expressed in terms of the number of reference pulses that are used during the phasing time interval, $T_p$. Then $$N = N_c - N_p \tag{1}$$

where $N_c$ is the number of reference pulses at the first frequency that are applicable to the phasing time interval in relation to the operation of the remote motor and $N_p$ is the number of reference pulses at a second frequency used during the phasing time interval in relation to the operation of the stepping motor.

Based on the foregoing conditions, $N_p$ can be expressed as $N_p = FN_c$, where F is less than unity, since the phasing speed of the local motor is less than its speed when the phase difference count is taken. Then, equation (1) can be rewritten as $$N = (N_p/F) - N_p \tag{2}$$

or $$N_p = FN/1 - F \tag{3}$$

Accordingly, with F and N known, the number of pulses, $N_p$, that will be produced during the phasing time interval, $T_p$, can be determined which, of course, means that the relationship for obtaining the desired phase correction as set forth by equation (1) will be satisfied.

If the phase difference is found in terms of a count N representing the amount that the local motor lags the remote motor, the local motor can be operated at a faster speed during the phasing time interval than that used to obtain the phase difference count to establish the desired phase alteration. Under such circumstances, the following equations would apply:

$$N = N_p - N_c \tag{4}$$

$$N = N_p - (N_p/F), \tag{5}$$

where F is greater than unity;

$$N_p = NF/F - 1 \tag{6}$$

Accordingly, the phase difference between two motors, such as the transmitter (remote) drum motor and receiver (local) drum motor of a facsimile system, can be altered by a method wherein a first signal is provided representing the angular position of one of said motors while it is rotating at a predetermined speed with a second signal provided representing the angular position of the other of said motors while it is rotating at the predetermined speed, which the method comprises the steps of providing a stepping motor as one of the motors; providing reference pulses at a first frequency; producing drive pulses for driving the stepping motor at a frequency that is directly related to the frequency of the reference pulses; applying the drive pulses to the stepping motor; determining the phase difference between the first and second signals in terms of a count (N) made of the reference pulses provided at said first frequency between the occurrence of one of the first and second signals and the subsequent occurrence of the other of the first and second signals; determining a phase altering count (may be N) from the count which is indicative of the degree to which the phase difference is to be altered; providing the reference pulses at a second frequency after the phase difference count is completed; and using the phase altering count and the reference pulses at the second frequency for establishing the operation of the stepping motor for a time interval ($T_p$) during which the difference between the number ($N_c$) of the reference pulses that could have been produced at the first frequency during said time interval and the number ($N_p$) of the reference pulses provided at the second frequency during said time interval is equal to the phase altering count.

Keeping in mind that equation (3) or (6) must be satisfied, the step calling for the use of the phase altering count and the reference pulses at the second frequency for establishing the operation of the stepping motor for the time interval required to satisfy the criteria set forth in the step can be accomplished by providing a control count based on the phase altering count, operating the stepping motor at a speed determined by drive pulses produced at a frequency directly related to reference pulses provided at a frequency that is F times the first frequency with count pulses provided that are based on the second frequency until the number of such count pulses is equal to the control count. For example, the control count could be $(F/|1-F|)N$, where N is the phase altering count allowing the reference pulses at the second frequency to be used as count pulses which would be provided until $(F/|1-F|)N$ count pulses have been produced.

In the event the stepping motor for the phase altering time interval is to operate at a speed less than the speed used for determining the phase difference count, F will be less than unity. F will be greater than unity if the stepping motor for the phase altering time interval is to operate at a speed greater than the speed used for determining the phase difference count.

Figures 1, 2, 3:
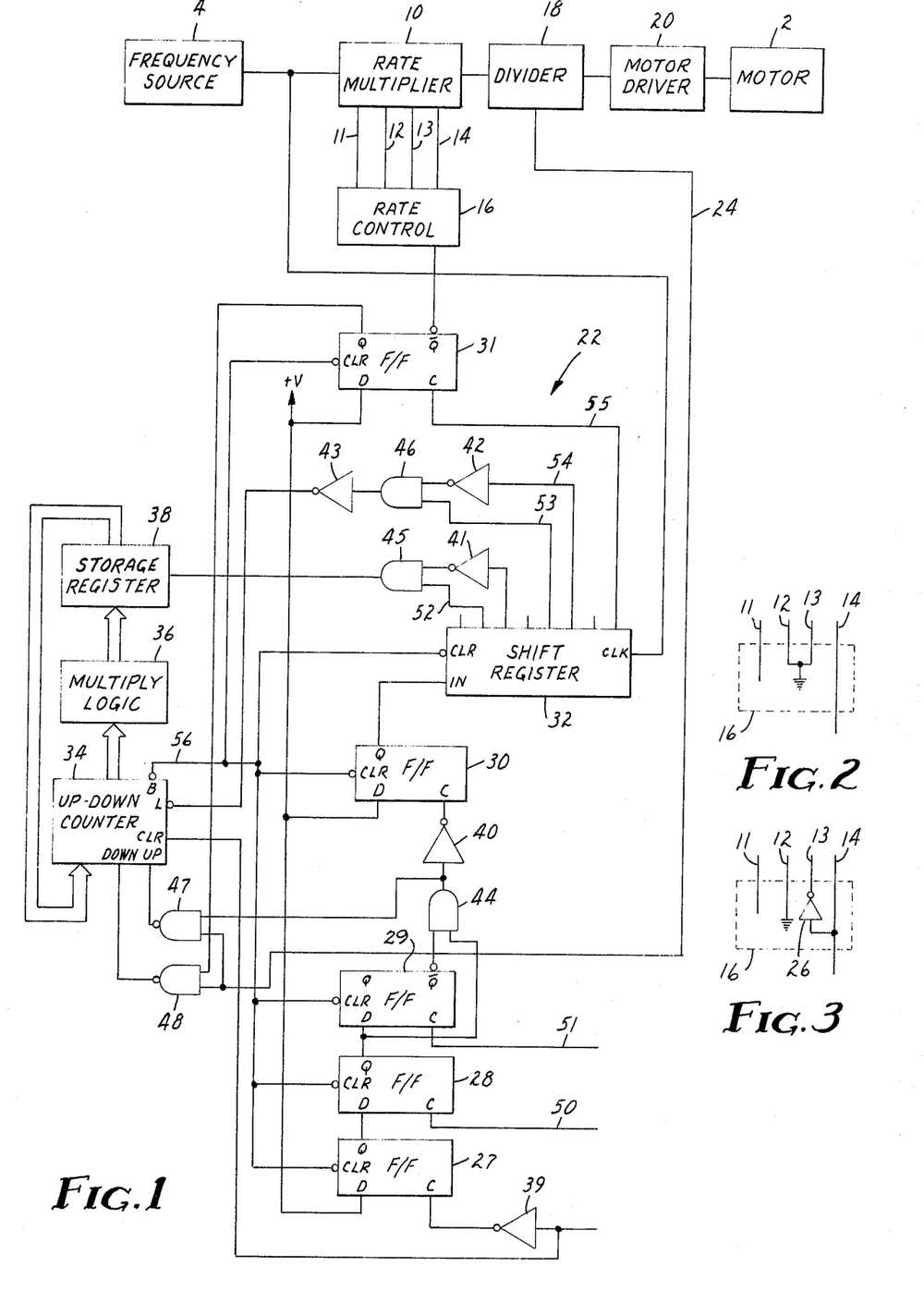
FIG. 1 illustrates a phasing system embodying the invention.
FIG. 2 is a detailed showing of one form for the rate control usable in the system of FIG. 1.
FIG. 3 is a detailed showing of another form for the rate control usable in the system of FIG. 1.

A system using the method that has been described is shown in FIG. 1. Only the circuitry for the control of the stepping motor (local), the speed of which is to be controlled to provide the phasing time interval, is shown. It is well known how a start pulse for initiating the operation of the circuitry for the phasing process and the phasing pulse from the other motor (remote)

plus the phasing pulse from the local motor can be provided.

The circuit portion for supplying drive pulses to the local stepping motor 2 includes a stable frequency source 4, which may, for example, be provided by a crystal oscillator and a divider. The output of the frequency source is supplied to a rate multiplier circuit 10. Rate multiplier circuits are commercially available. The rate multiplier is digitally controlled in accordance with the presence of high and low signals provided to the control inputs 11-14, inclusive, via the rate control portion 16, to provide pulses at its output at a frequency that is determined by the digital input and is less than the input frequency provided from the frequency source 4. The output of the rate multiplier 10 is applied to a divider 18 which provides pulses to a motor driver circuit 20 for providing drive pulses to the motor 2. The rate at which the pulses are provided from the divider 18 determines the speed of the motor. The motor 2 is a stepping motor, which, for example, can be a synchronous, two-phase, two-winding motor. The divider 18 also provides reference pulses on conductor 24 at a frequency intermediate that of the pulses received from the rate multiplier and the frequency of the pulses to the motor driver circuit 20. The intermediate frequency is used as a reference clock for the control circuitry indicated generally at 22. Since the rate at which pulses are provided to the motor driver circuit 20 is a division of the reference clock frequency, the drive pulses and, therefore, the motor speed are directly related to the frequency of the reference pulses.

The control circuitry 22 includes the rate control 16 connected to the rate multiplier 10. The control circuitry 22 provides a count at the reference clock frequency provided on conductor 24 of the phase difference between the phase pulse provided by one of the remote and local motors and the phase pulse provided by the other of the two motors with such phase difference count being used as the phase altering count. The circuitry 22 multiplies the phase altering count by $F/|1-F|$, where F is a number other than unity and corresponds to the number by which the frequency used for obtaining the phase difference count is multiplied by the rate multiplier 10 as determined by the control circuitry 22 to establish the phasing speed for the motor for the phasing time interval. For example, a rate multiplier, available under the description MC 14527 from Motorola, Incorporated, can, based on binary signals applied to the control inputs 11-14, provide pulses to the divider 18 so that reference pulses at a first frequency are provided on conductor 24, which is directly related to the frequency of the drive pulses provided to the motor 2 for operating it at the speed used when the phase difference count is determined and can provide pulses that are 10/9, 8/9, 7/9... or 1/9 of the frequency used to provide the reference pulses at the first frequency. The rate multiplier output is directly related to the binary input to control inputs 11-14. For example, inputs of 1001 at inputs 11-14, respectively, provides a multiplier of 9/9 which may be used to cause the frequency output of the multiplier to be that required to provide the above-mentioned reference pulses at the first frequency. A multiplier of 10/9 is provided by inputs of 1010 at inputs 11-14, respectively, with a multiplier of 8/9 provided by inputs of 1000 at inputs 11-14, respectively.

FIG. 2 shows an arrangement for the rate control 16 whereby a positive voltage is applied to input 11, with inputs 12 and 13 connected to ground so inputs of 100 are presented at inputs 11-13, respectively. Accordingly, a high (1) signal applied to input 14 provides a multiplier of 9/9 and a low (0) signal applied to input 14 provides a multiplier of 8/9. If the multiplier 9/9 provides a frequency related to the speed of the motor 2 when making the phase difference count, the 8/9 multiplier can be used when the motor 2 is to operate at a slower speed during the phasing time interval. Similarly, FIG. 3 shows an arrangement for the rate control 16 whereby a positive voltage is applied to input 11 with input 12 connected to ground and the input to 13 being connected to input 14 via an inverter so the input 13 is the inverse of the input applied to input 14. Accordingly, a high (1) signal applied to input 14 causes the rate multiplier to operate in response to a binary number of 1001 to provide a multiplier of 9/9, while a low (0) signal applied to input 14 causes the rate multiplier to operate in response to a binary number 1010 to provide a multiplier of 10/9. Accordingly, if the multiplier 9/9 results in a frequency that is related to the speed of the motor when making the phase difference count, the 10/9 multiplier can be used when motor 2 is to be operated at a higher speed during the phase time interval.

For purposes of providing further explanation of the control circuit 22, it is assumed, as before, that the phase difference count obtained represents the amount by which the local motor (motor 2) leads the remote motor (not shown), i.e., the phase pulse corresponding to the position of local motor initiates the phase count while the phase pulse corresponding to the position of the remote motor terminates the count. The speed of the local motor 2 during the phasing time interval will be less than its speed during the phase difference count so the arrangement for control rate 16 per FIG. 2 can be used.

The control circuit 22, in addition to the rate control 16, includes five D-type flip-flop circuits 27-31, inclusive, a shift register 32, an up-down counter 34, multiply logic 36, storage register 38, inverters 39-43, inclusive, AND gates 44-46, and NAND gates 47 and 48.

When power is applied to the circuit, the five flip-flops 27-31 plus the shift register 32 are arranged using known techniques to be in a cleared condition. A positive voltage is supplied to the D terminal of flip-flops 27, 30 and 31. The $\overline{Q}$ output of flip-flop 31 is then high causing the output of the rate control 16 per FIG. 2 to control the rate multiplier so the reference clock pulses from divider 18 are at a first frequency with the motor driver 20 providing drive pulses to the motor 2 at a rate directly related to such first frequency to cause motor 2 to operate at a predetermined speed equal to that of the remote motor (not shown). The control circuit 22 waits for the receipt of a positive start pulse to be applied to the inverter 39 and counter 34. The start pulse is effective to clear the counter 34. The trailing edge of the inverted start pulse is effective to set the flip-flop 27 causing a high signal to appear at the Q output of flip-flop 27, which is connected to the D terminal for flip-flop 28. The control circuit 22 then waits for a local pulse on conductor 50 which is indicative of the position of the motor 2 used to drive the drum of the facsimile machine at the local or receiver position. The positive going edge of a local pulse causes the Q output of the flip-flop 28 to go high. This high signal is applied to one input of AND gate 44 and to the D terminal of flip-flop 29. The $\overline{Q}$ output of flip-flop 29 is also high and is connected to the other terminal of AND gate 44 causing the output of AND gate 44 to be high. The output of AND gate 44 is connected to NAND gate 47 to which the reference clock pulses at the first frequency from divider 18 are also applied. With the high output from AND gate 44 applied to NAND gate 47, NAND gate 47 provides a low signal at its output each time a reference clock pulse is received from divider 18. The output of NAND gate 47 is connected to the UP input of the counter 34 causing the counter 34 to add one to its count each time a reference clock pulse is received for such time as the output of AND gate 44 remains low. While such count is being made, the circuitry waits for a remote phase pulse indicative of the angular position of the remote motor to be provided on conductor 51 to the C terminal of flip-flop 29. The positive going edge of a remote pulse sets the flip-flop 29 causing the $\overline{Q}$ output of flip-flop 29 to go low, thereby removing the high signal to NAND gate 47 from the output of AND gate 44 to terminate the count at the counter 34. The output of AND gate 44 is also connected to an inverter 40 which is connected to the C terminal of flip-flop 30 so the change from a high to low output at the AND gate 44 is reflected as a change from a low to high signal at the C terminal of flip-flop 30 causing flip-flop 30 to be set to apply a high signal from its Q output to the "in" terminal of shift register 32. The shift register 32 is used to provide a slight time delay before the count obtained is multiplied and loaded into the counter 34. The clock input of the shift register is connected to receive clocking pulses provided from the frequency source 4. A shift register clock pulse causes a high signal received at the "in" terminal of the shift register 32 to appear at the first output of the shift register. This high signal then is shifted to the other outputs in sequence as further clock pulses are received. The clock pulses for the shift register are, or course, at a higher frequency than the reference clock pulses provided from divider 18. Upon receiving the second clock pulse, subsequent to the shift register 32 being conditioned by the high signal from the flip-flop 30, a high signal is provided on conductor 52 connected to AND gate 45 from the shift register 32. At this time, the output of the shift register connected to the inverter 41 causes a high to be present at the other input of AND gate 45. A high signal is thus presented at the output of AND gate 45 which is connected to the clock input of the storage register 38. The phase difference count at the output of the counter 34 is connected to the multiply logic 36 where it is multiplied with the resulting product connected to the storage register 38 which has its output to the counter 34. The clock pulse received from AND gate 45 by the storage register 38 is effective to shift the output of the multiply logic 36 to the counter 34.

In the case of rate multiplier 10 and the rate control 16 discussed earlier, wherein the frequency from the rate multiplier is to be reduced for the phasing interval and the control count is to be $F/|1-F|$ times the phase difference count, the multiply logic 36 provided multiplies the count by $F/|1-F|$. Thus, if $F = 8/9$ is used, which will result in a reduction in the speed of motor 2, the multiply logic 36 is designed to provide a multiple of 8.

Operation of the shift register 32 continues causing a high signal to be presented on conductor 53 from register 32, which with the output of the inverter 42, which is receiving a low signal on conductor 54 from the register 42, causes a high signal to be presented at the output of the AND gate 46 which is inverted by the inverter 43 connected to the load terminal of the counter 34 causing the multiplied count from the storage register 38 to be loaded with the counter 34. The counter 34 thus presents a control count which is a multiple of the phase difference count that was made between the receipt of the local pulse from motor 2 and the succeeding remote pulse representative of the angular position of the remote motor. Operation of the shift register 32 continues until a high signal is presented on the conductor 55 connected to the C terminal of the flip-flop 31 causing a low signal to be provided at its $\overline{Q}$ terminal with a high signal at its Q output.

The low signal presented at the $\overline{Q}$ output of flip-flop 31 is effective to change the output of the rate control and, therefore, the output of the rate multiplier 10, to cause a lower reference frequency to be provided on conductor 24 from divider 18 with the speed of motor 2 being reduced in relation to the change in the reference frequency. The high signal present at the Q output of flip-flop 31 is applied to the NAND gate 48 which has its output connected to the "down clock" terminal of counter 34. Each pulse of the reference clock, which is also connected to the NAND gate 48, is then effective as a count pulse to subtract one from the count of the counter 34 each time a reference clock pulse is presented. Once the count has been reduced to zero, a low signal is provided at the "borrow" output terminal 56 of the counter 34 indicating the count is expired. This low signal is effective to clear the five flip-flops 27-31 plus the shift register 32. With the flip-flop 31 cleared, the $\overline{Q}$ output is changed from a low to a high signal causing the output of the rate control 16 to change to cause the rate multiplier 10 to return to the condition for presenting its normal output to the divider 18, and, thus, cause the motor 2 to return to the desired predetermined speed.

In the event the phase difference count is to be in terms of the degree to which the local motor 2 lags the remote motor with the speed of motor 2 being increased during the phasing time interval to make the desired phase correction, the circuit 22 is changed so the phase signal corresponding to the angular position of the remote motor is applied to conductor 50 with the phase signal for the local motor 2 being applied to the conductor 51. FIG. 3 for the rate control 16 then can be used. The increase in the frequency from the rate multiplier for the phasing time interval is established by a new number F, which is greater than unity, from which the multiple, $F/|1-F|$, for the multiply logic 36 can be determined and the necessary multiply logic provided. For example, if the rate multiplier 10 provides a new frequency that is 10/9 of the normal frequency provided, as would be the case with rate control 16 per FIG. 3 used, the multiple for the multiply logic is 10.

Figure 4:
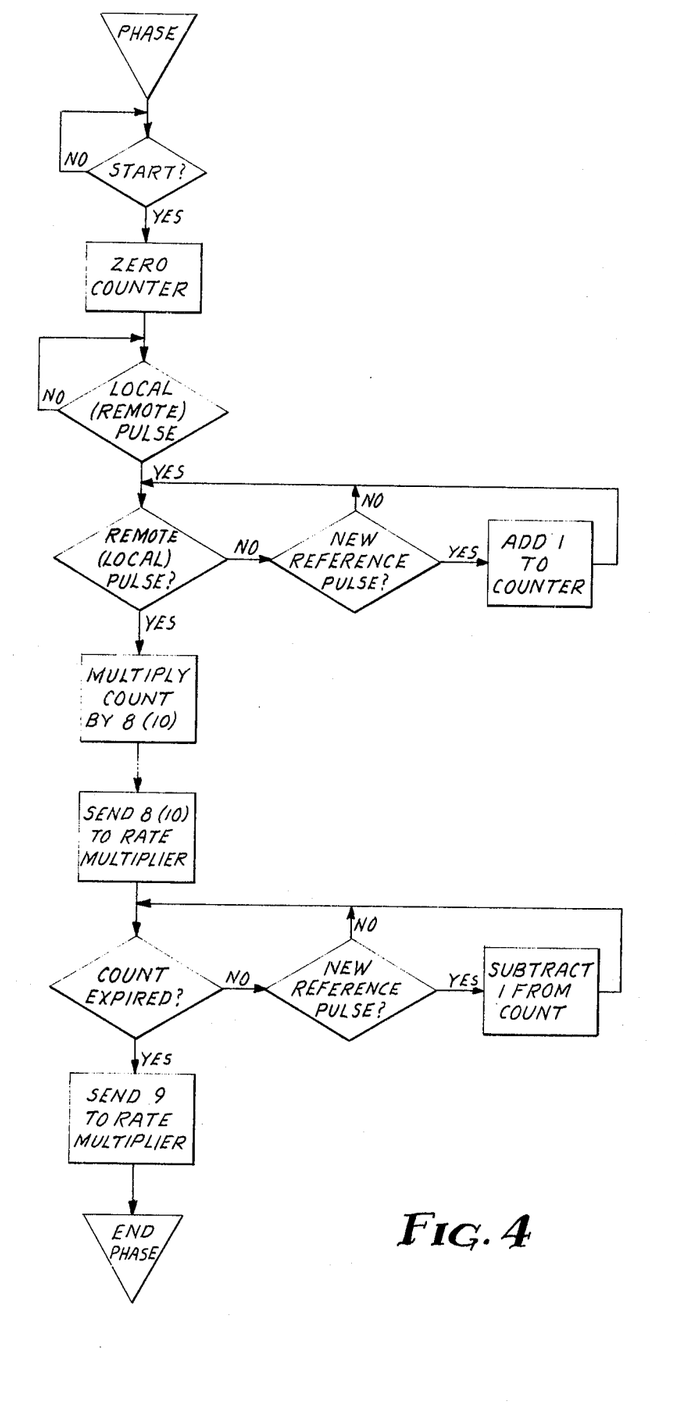
FIG. 4 is a flow diagram for the system of FIG. 1.

FIG. 4 is a showing of the flow diagram for the control circuit 22 as described wherein the phase difference is measured in terms of a count indicative of the degree to which the local motor 2 leads the remote motor with the local motor 2 operated at a reduced speed for the phasing time interval. The changes required in the flow diagram, for the control circuit 22 providing a measurement of the phase difference count is in terms of the degree to which the local motor 2 lags the remote motor with the local motor 2 operated at a higher speed to alter the phase difference, are shown by those portions presented in brackets.

The flow diagram shown in FIG. 4, which is applicable to the particular configuration of the control circuit 22 shown in FIG. 1, can be used to program any number of suitable microprocessor circuits such as a type PPS 4/1 available from Rockwell, Incorporated. As has been mentioned, the use of a microprocessor is desirable, since it can also be programmed to carry out other functions in a facsimile system, for example. Also, the microprocessor would provide a less expensive control circuit, if it were to be used in sufficient quantities such as for facsimile equipment.

Figure 5:
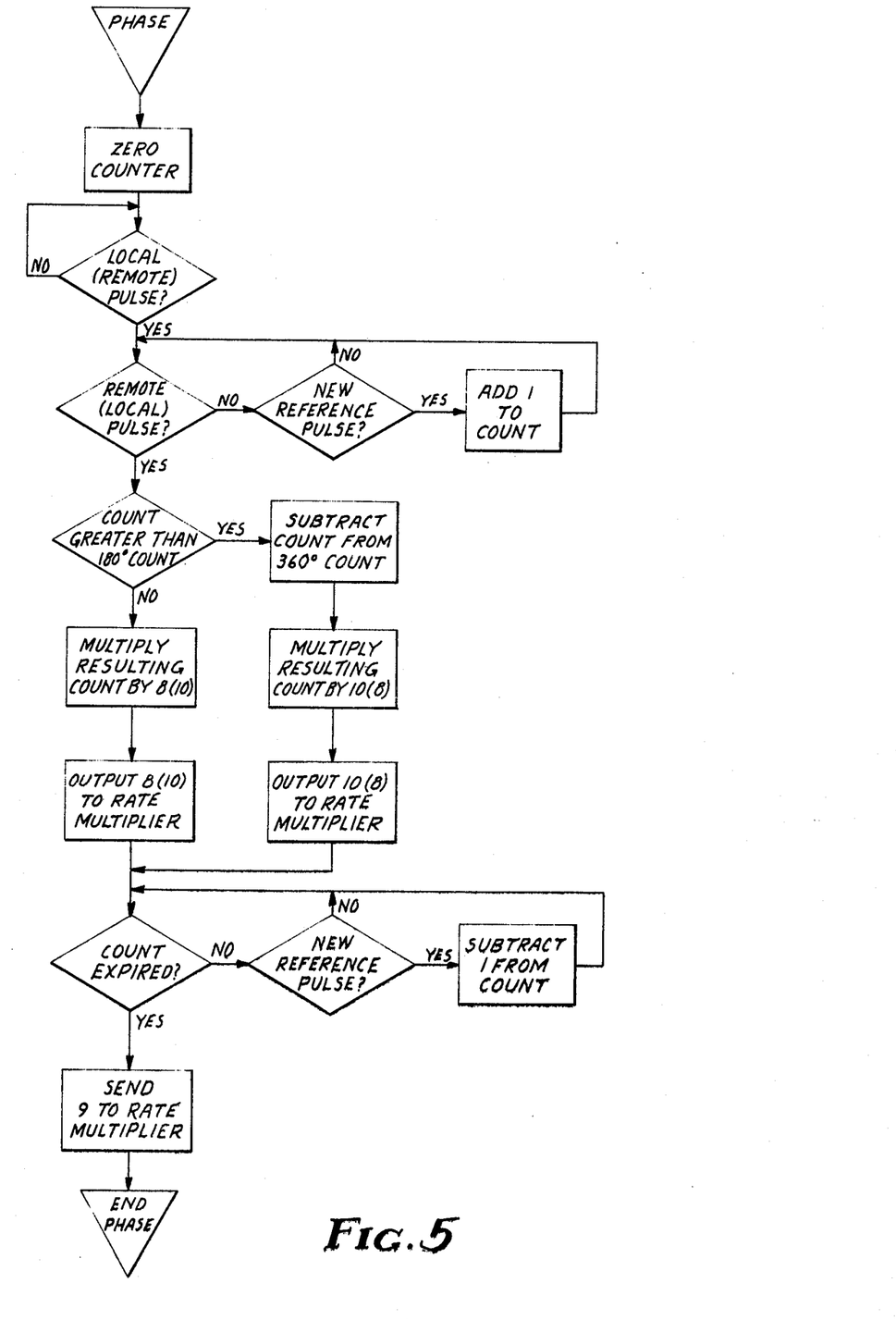
FIG. 5 is a flow diagram for a system and method embodying the invention.

The availability of programmable microprocessors makes it possible to implement modifications of the method that has been described. For example, the phase altering count can be determined by evaluating the phase difference count with respect to the count that is applicable to a phase difference of 180° and the count applicable to a full revolution (360°) can be made. In so doing, the phase difference can be corrected in the least amount of time by either speeding up the local motor or slowing it down dependent on whether the count is greater or less than the count corresponding to 180°. If the count corresponding to a phase difference of 180° is, for example, 200 and, therefore, 400 for 360°, a phase difference count of the degree to which the local motor leads the remote motor is compared with 200, and if it is less than 200, the phase difference is corrected by slowing the local motor down for the required phasing time interval. The phasing time interval can be established as indicated by that portion of the flow diagram of FIG. 4 following the completion of the count. If the count is greater than 200, such count is subtracted from 400 and the local motor is then operated at an increased speed for the required phasing time interval using the remaining count. In such case, the phasing time interval can be established as indicated by that portion of the flow diagram of FIG. 4 (using the bracketed portions) following completion of the count. FIG. 5 is a flow diagram of the phasing method as so modified. The flow diagram contains sufficient information for programming a microprocessor to implement such modified method. The portions shown in brackets indicate the changes needed in the flow diagram when the remote phase pulse is used to initiate the phase difference count in terms of the degree to which the remote motor leads the local motor. The multipliers 8 and 10 that are used are only shown by way of example and are based on the examples previously used in connection with the rate multiplier that has been discussed.

The basic method that has been described for altering the phase difference detected between two motors can be utilized in a method that provides for complete correction of a phase difference that is carried out at more than one correction rate. For example, it may be desirable when the phase correction exceeds a predetermined amount to carry out a portion of the phase correction at one rate, increase the correction rate to obtain correction of another portion of the phase correction and then return to the initial correction rate for the balance of the phase correction. Thus, for example, a phase difference count that is obtained indicative of the degree to which the local motor leads the remote motor is first examined to determine whether it is less than some predetermined number, 32, for example. If it is less, the phase correction is carried on by reducing the speed of the local motor for a phasing time interval in the manner as indicated by that portion of the flow diagram in FIG. 4, which follows the completion of the count. If the count is not less than 32, 32 is subtracted from the main count. The main count remainder is used as a phase altering count from which a phasing time interval is established during which the local motor is operated at the lower of two phasing speeds which, in the case of the rate multiplier 10 that has been described, is established when the rate multiplier is provided with a binary 7 input in which case $F = 7/9$. The phase time interval for the main count remainder can be established by multiplying it by $F/|1-F|$. For $F = 7/9$, the multiplier is 7/2, which can, for example, be obtained by multiplying the main count remainder by 7 and then dividing such result by 2. Before this is done, the 7/2 multiplier requires that the main count remainder be examined to determine whether it is even or odd, since the result obtained when multiplying by 7/2 must be a whole number. Accordingly, if the main count remainder is odd, it is increased by one.

A count of 16 or one-half the 32 count is used to first lower the speed of the local motor to a rate that is not as slow as that to be used for the phase altering count obtained from the main count remainder. This is necessary, since the inertia of the motor would not permit a large change to be made in the motor speed without introducing an unacceptable error. Similarly, upon completion of the phase correction corresponding to the main count remainder, the motor speed is raised to an intermediate level for a count of 16 (15, if it was necessary to add one to the main count remainder) before it is returned to the normal speed at which the local motor is operated. In the case of the rate multiplier discussed, the intermediate speed that is needed when the phasing rate is increased and when it is decreased can be established by providing a binary 8 to the rate multiplier 16 so the local motor speed would operate a 8/9 of its normal speed.

Figure 6:
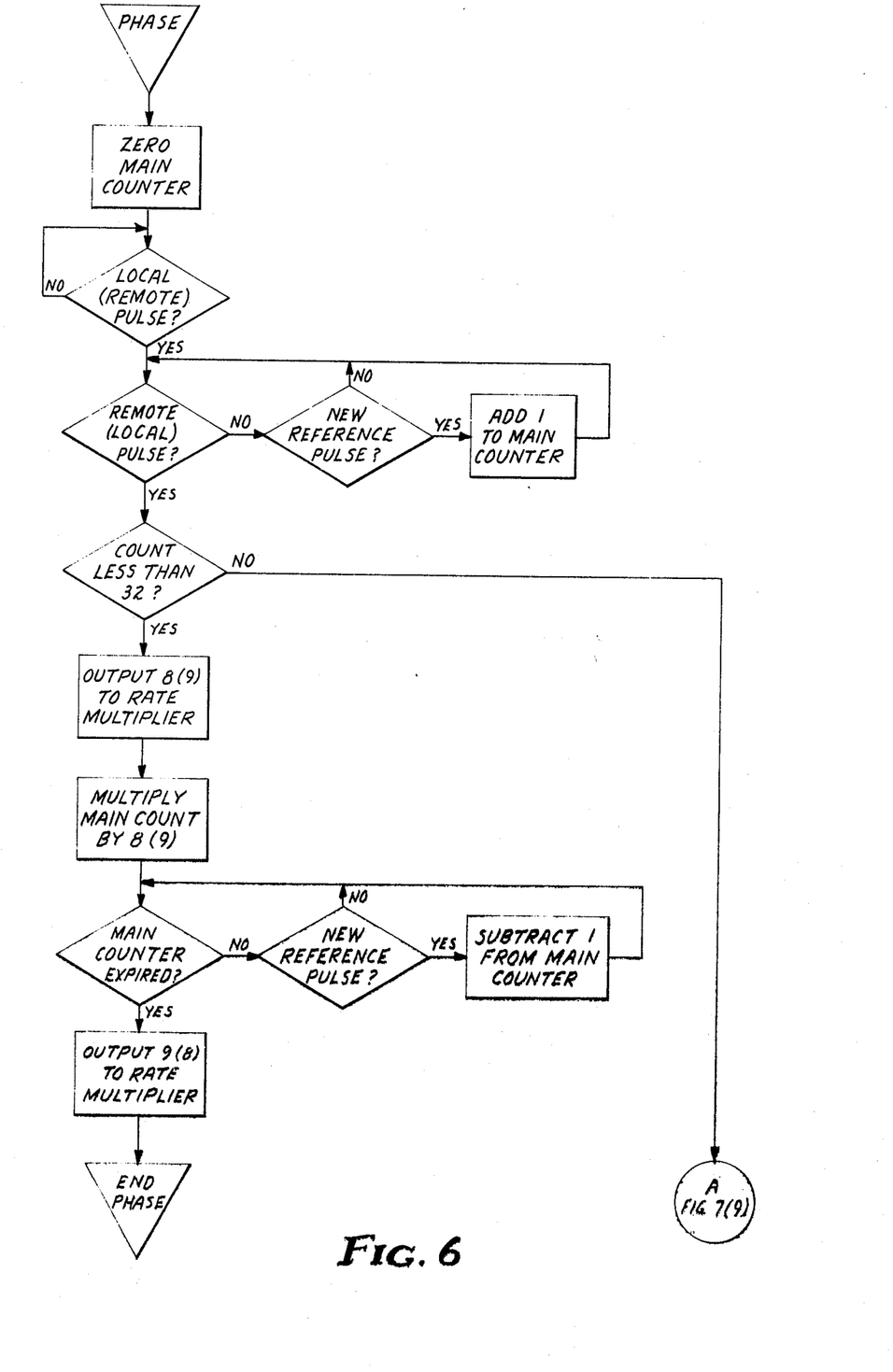
FIGS. 6, 7 and 8 are the flow diagram for another system and method embodying the invention.
Figure 7:
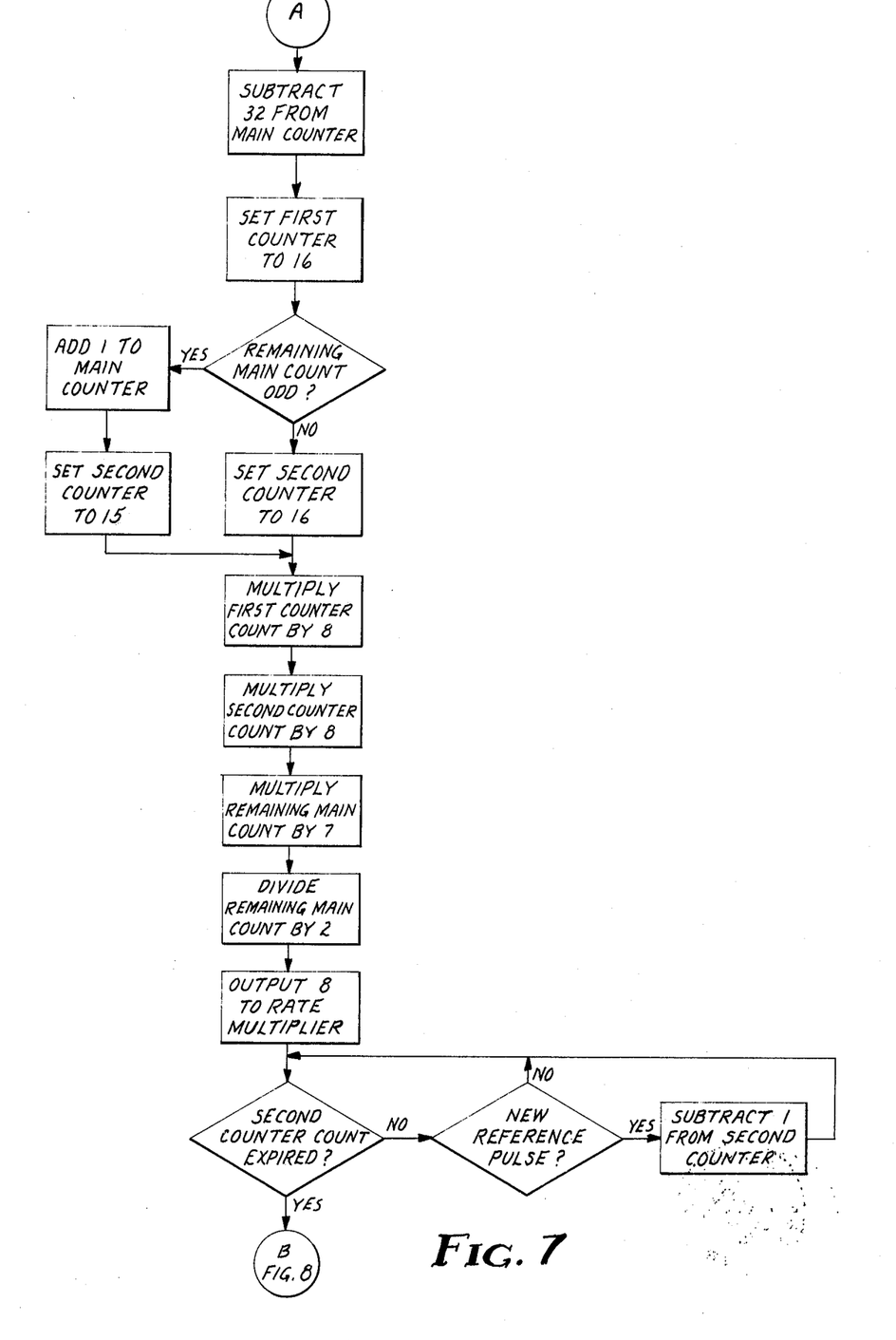
Figures 8, 9:
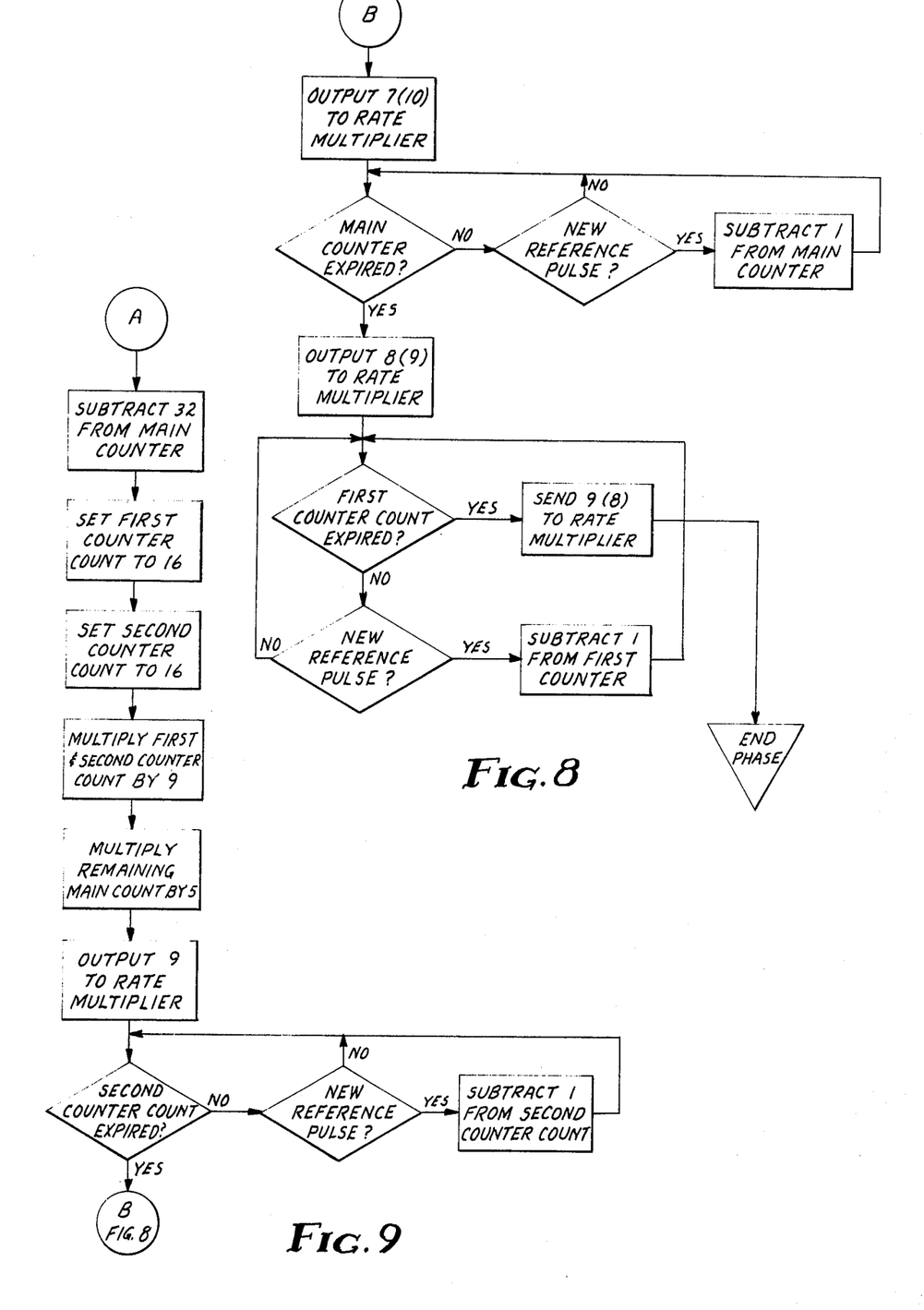
FIG. 9 is a portion of a flow diagram which with FIGS. 6 and 8 provides a flow diagram of still another system and method embodying the invention.

FIGS. 6, 7 and 8 set forth the flow diagram of the phasing method just described provide sufficient information for programming a microprocessor to implement such method.

It can be appreciated that such method is also applicable with respect to a system wherein the phase difference count is obtained in terms of degree to which the remote motor leads the local motor. In that case, if the rate multiplier 10, that has been discussed, were to be used, the frequency of the frequency source 4 would be changed so that the normal speed for the local motor would be provided in response to a binary input of 8 to the rate multiplier. If the phase difference count is less than 32, the correction for such count is accomplished as before, but with local motor at a speed of 9/8 its normal speed. For a phase difference count of 32 or more, the phase correction would be accomplished by increasing the local motor is speed to 9/8 of the normal speed for a count of 16, then increasing it to 10/8 of the normal speed for the main count remainder and then reducing it for a count of 16 to 9/8 of the normal speed before returning to the normal speed. F is then 9/8 or 10/8 for purposes of determining the multiples for the phase altering counts that are involved. FIGS. 6, 7 and 9, when viewed per the portions indicated in brackets, provide a flow diagram for the method just described.

Figure 10:
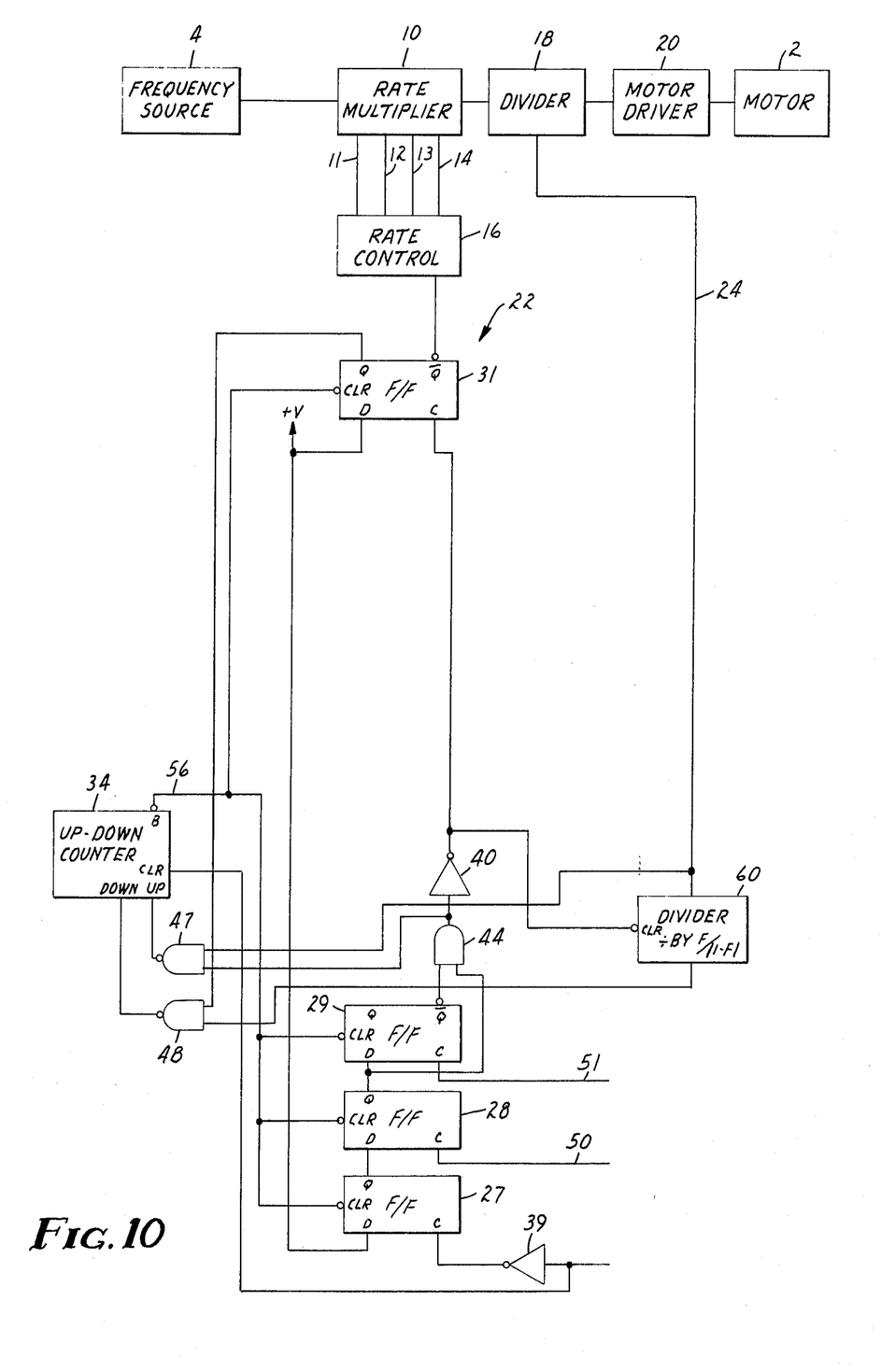
FIG. 10 is another phasing system embodying the invention.
Figure 11:
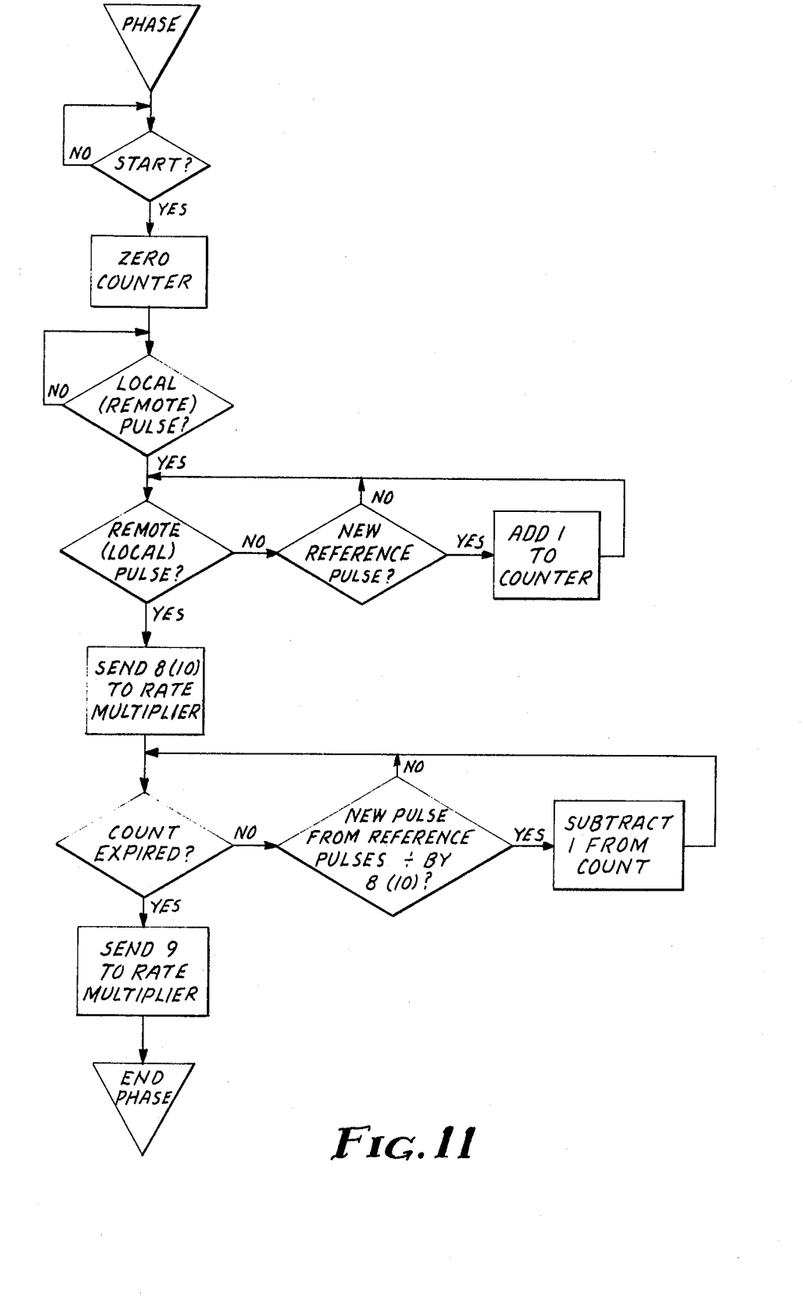
FIG. 11 is a flow diagram for the system of FIG. 10.

All of the specific examples described in detail thus far, use a phase time interval for a phase altering count that is established by multiplying the phase altering count by $F/|1-F|$ to obtain a control count and then reducing such control count to zero in response to count pulses provided by reference pulses at a second frequency. This is based on equations (3) and (6). It is obvious that the relationship $N_p = (F/|1-F|) N$ (equations 3 and 6) can be rewritten as $N = (|1-F|/F) N_p$ showing that the basic method of this invention is also practiced when the phase time interval for a phase altering count is established by reducing such count to zero in response to count pulses obtained by dividing the reference pulses at a second frequency by $F/|1-F|$. FIG. 10 shows the circuitry required for carrying out the method in such a manner. It is similar to the circuitry shown in FIG. 1 and the reference numerals used in FIG. 1 are used to identify like parts. The circuitry portion of FIG. 1 required for multiplying the phase altering count to obtain the control count is eliminated allowing the output of inverter 40 to be connected directly to the C input of flip-flop 31. A divider 60, which is cleared by the output of inverter 40, is added to provide the count pulses for counting the counter 34 down. The divider 60 serves to divide the reference pulses provided from divider 18 by $F/|1-F|$. As in the case of the circuitry for FIG. 1, if the phase difference count is obtained so it is an indication of the degree the local motor leads the remote motor, F is selected to be less than unity, for example, 8/9, so $(F/|1-F|) = 8$. Similarly, the phase difference count is obtained so it is an indication of the degree the remote motor leads the local motor, F is selected to be greater than unity, for example, 10/9, so $(F/|1-F|) = 10$. FIG. 11 is a flow diagram for the circuitry shown in FIG. 10 wherein the phase difference count made is in terms of the degree the local phase pulse leads the remote phase pulse with the portions shown in parentheses being applicable to the situation when the phase difference count is made in terms of the degree the remote phase pulse leads the local phase pulse.

It is also apparent that were F selected such that $(F/|1-F|)$ was a fraction, e.g., 7/2, it would be possible to establish the control count by multiplying the phase altering count (N) by 7 and dividing the reference pulses by 2 to provide the necessary count pulses.

It is also evident that the flow diagram set forth in FIG. 5 could be changed so the phasing time interval is established on the basis of using the phase altering count as the control count and providing count pulses for reducing the control count to zero where such count pulses are obtained by dividing the reference pulse at the second frequency by $F/|1-F|$.

The specific circuits shown in FIGS. 1 and 10 are exemplary and other equivalent circuits may be utilized. As has been mentioned, a microprocessor circuit that is programmed to carry out the various operations indicated by the flow diagrams that have been set forth, for example, may be used. In addition to the circuit components already mentioned, specific commercially known circuit components usable in the circuits of FIGS. 1 and 10 are listed below.

| COMPONENT | TYPE AND MANUFACTURER |
|---|---|
| Counter 34 | 74C193 - National Semiconductor Corporation |
| D-Type Flip-Flops, 27-31 | 74C74 - National Semiconductor Corporation |
| Dividers 18 and 60 | CD4020 - RCA Corporation |
| Multiply Logic 36 | 1702 ROM - Intel Corporation |
| Shift Register 32 | 74C164 - National Semiconductor Corporation |
| Storage Register 38 | 74C174 - National Semiconductor Corporation |

What is claimed is:

1. A method for altering the phase difference between two motors wherein a first signal is provided representing the angular position of one of said motors while it is rotating at a predetermined speed with a second signal provided representing the angular position of the other of said motors while it is rotating at the predetermined speed, comprising the steps of
    a. providing a stepping motor as one of the motors;
    b. providing reference pulses at a first frequency;
    c. producing drive pulses at a frequency that is directly related to the frequency of said reference pulses for driving said stepping motor at the predetermined speed;
    d. applying said drive pulses to said stepping motor;
    e. determining the phase difference between the first and second signals in terms of a count made of said reference pulses provided at said first frequency between the occurrence of one of the first and second signals and the subsequent occurrence of the other of the first and second signals;
    f. determining a phase altering count from said count which is indicative of the degree to which the phase difference is to be altered;
    g. providing reference pulses at a second frequency; and
    h. using said phase altering count and said reference pulses at said second frequency for establishing the operation of said stepping motor for a time interval during which the difference between the number of reference pulses at said first frequency that could have been produced at said first frequency during said time interval and the number of said reference pulses provided at said second frequency during said time interval is equal to said phase altering count.

2. The method according to claim 1 wherein said phase altering count is at least a portion of said count.

3. The method according to claim 2 wherein the first signal represents the angular position of said stepping motor, said count is made between the occurrence of the first signal and the subsequent occurrence of the second signal, said second frequency is F times said first frequency, where F is a number less than unity, and step (h.) includes the steps of
    1. multiplying said phase altering count by $(F/1-F)$; and
    2. operating said stepping motor at a speed directly related to said second frequency until the number of said reference pulses provided at said second frequency is equal to the result obtained in step (1), thereby providing said time interval.

4. The method according to claim 2 wherein the first signal represents the angular position of said stepping motor, said count is made between the occurrence of the second signal and the subsequent occurrence of the first signal, said second frequency is F times said first frequency, where F is a number greater than unity, and step (h.) includes the steps of
    1. multiplying said phase altering count by $(F/F-1)$; and
    2. operating said stepping motor at a speed directly related to said second frequency until the number of said reference pulses provided at said second frequency is equal to the result obtained in step (1), thereby providing said time interval.

5. The method according to claim 1 wherein said phase altering count is at least a portion of what is the smaller of said count and the difference between the number of said pulses at said frequency that are needed for one revolution of said stepping motor and said count.

6. The method according to claim 5 wherein the first signal represents the angular position of said stepping motor, said count is made between the occurrence of the first signal and the subsequent occurrence of the second signal, said second frequency is F times said first frequency, where F is less than unity, and step (h.) includes the steps of
 1. multiplying said phase altering count by $(F/1-F)$; and
 2. operating said stepping motor at a speed directly related to said second frequency until the number of said reference pulses provided at said second frequency is equal to the result obtained in step (1), thereby providing said time interval.

7. The method according to claim 5 wherein the first signal represents the angular position of said stepping motor, said count is made between the occurrence of the second signal and the subsequent occurrence of the first signal, said second frequency is F times said first frequency, where F is greater than unity, and step (h.) includes the steps of
 1. multiplying said phase altering count by $(F/F-1)$; and
 2. operating said stepping motor at a speed directly related to said second frequency until the number of said reference pulses provided at said second frequency is equal to the result obtained in step (1), thereby providing said time interval.

8. The method according to claim 2 wherein the first signal represents the angular position of said stepping motor, said count is made between the occurrence of the first signal and the subsequent occurrence of the second signal, said second frequency is F times said first frequency, where F is a number less than unity, and step (h.) includes the steps of
 1. providing count pulses by dividing said reference pulses at said second frequency by $F/1-F$; and
 2. operating said stepping motor at a speed directly related to said second frequency until the number of said count pulses is equal to said phase altering count, thereby providing said time interval.

9. The method according to claim 2 wherein the first signal represents the angular position of said stepping motor, said count is made between the occurrence of the second signal and the subsequent occurrence of the first signal, said second frequency is F times said first frequency, where F is a number greater than unity, and step (h.) includes the steps of
 1. providing count pulses by dividing said reference pulses at said second frequency by $(F/F-1)$; and
 2. operating said stepping motor at a speed directly related to said second frequency until the number of said count pulses provided at said second frequency is equal to said phase altering count, thereby providing said time interval.

10. The method according to claim 5 wherein the first signal represents the angular position of said stepping motor, said count is made between the occurrence of the first signal and the subsequent occurrence of the second signal, said second frequency is F times said first frequency, where F is less than unity, and step (h.) includes the steps of
 1. providing count pulses by dividing said reference pulses at said second frequency by $(F/1-F)$; and
 2. operating said stepping motor at a speed directly related to said second frequency until the number of said count pulses provided at said second frequency is equal to said phase altering count, thereby providing said time interval.

11. The method according to claim 5 wherein the first signal represents the angular position of said stepping motor, said count is made between the occurrence of the second signal and the subsequent occurrence of the first signal, said second frequency is F times said first frequency, where F is greater than unity, the step (h.) includes the steps of
 1. providing count pulses by dividing said reference pulses at said second frequency by $(F/F-1)$; and
 2. operating said stepping motor at a speed directly related to said second frequency until the number of said count pulses provided at said second frequency is equal to said phase altering count, thereby providing said time interval.

12. A system for altering the phase difference between two motors wherein a first signal is provided representing the angular position of one of said motors while it is rotating at a predetermined speed with a second signal provided representing the angular position of the other of said motors while it is rotating at the predetermined speed, comprising:
 a. a stepping motor providing one of the motors;
 b. pulse producing means selectively operable for providing reference pulses at a first frequency and at least at one other frequency;
 c. means connected to said pulse producing means and said stepping motor, said means provided drive pulses at a frequency directly related to the frequency of the reference pulses provided by said pulse producing means, said drive pulses providing operation of said stepping motor at the predetermined speed when said pulse producing means is providing reference pulses at said first frequency; and
 d. control means connected for selectively controlling said pulse producing means for providing reference pulses at said first frequency and connected to receive said first and second signals plus said reference pulse from said pulse producing means for providing a count of said reference pulses from said pulse producing means that are provided at said first frequency between the occurrence of one of the first and second signals and the subsequent occurrence of the other of the first and second signals, said control means providing a phase altering count based on said count and responsive to said phase altering count for selectively controlling said pulse producing means for a time interval for providing reference pulses other than that at said first frequency such that the difference between the number of reference pulses at said first frequency that could have been produced during said time interval and the number of reference pulses provided during said time interval is equal to said phase altering count.

13. The system according to claim 12 wherein said control means is a programmed microprocessor.

14. The system according to claim 12 wherein said phase altering count is at least a portion of said count.

15. The system for altering the phase difference between two motors according to claim 14 wherein the first signal represents the angular position of said stepping motor, said count is made between the occurrence of the first signal and the subsequent occurrence of the second signal and said control means includes means for multiplying said phase altering count by $F/1-F$, where F is a number less than unity and said control means in response to said second signal selects the operation of said pulse producing means to provide said reference pulses at a frequency of F times said first frequency until the number of such pulses produced is equal to said phase altering count multiplied by $F/1-F$, thereby providing said time interval.

16. The system according to claim 15 wherein said control means is a programmed microprocessor.

17. The system for phasing two motors according to claim 14 wherein the first signal represents the angular position of said stepping motor, said count is made between the occurrence of the second signal and the subsequent occurrence of the first signal and said control means includes means for multiplying said phase altering count by $F/F-1$, where F is greater than unity and said control means in response to said first signal selects the operation of said pulse producing means to provide said reference pulses at a frequency of F times said first frequency until the number of such pulses produced is equal to said phase altering count multiplied by $F/F-1$, thereby providing said time interval.

18. The system according to claim 17 wherein said control means is a programmed microprocessor.

19. The system according to claim 12 wherein said control means is a programmed microprocessor for providing said phase altering count as at least a portion of what is the smaller of said count and the difference between the number of said pulses at said frequency that are needed for one revolution of said stepping motor and said count.

20. The system for altering the phase difference between two motors according to claim 19 wherein the first signal represents the angular position of said stepping motor, said count is made between the occurrence of the first signal and the subsequent occurrence of the second signal and said control means includes means for multiplying said phase altering count by $F/1-F$, where F is less than unity and said control means in response to said second signal selects the operation of said pulse producing means to provide said reference pulses at a frequency of F times said first frequency until the number of such pulses produced is equal to said phase altering count multiplied by $F/1-F$, thereby providing said time interval.

21. The system according to claim 20 wherein said control means is a programmed microprocessor.

22. The system for phasing two motors according to claim 19 wherein the first signal represents the angular position of said stepping motor, said count is made between the occurrence of the second signal and the subsequent occurrence of the first signal and said control means includes means for multiplying said phase altering count by $F/F-1$, where F is greater than unity and said control means in response to said first signal selects the operation of said pulse producing means to provide said pulses at a frequency of F times said first frequency until the number of such pulses produced is equal to said phase altering count multiplied by $F/F-1$, thereby providing said time interval.

23. The system according to claim 22 wherein said control means is a programmed microprocessor.

24. The system for altering the phase difference between two motors according to claim 14 wherein the first signal represents the angular position of said stepping motor, said count is made between the occurrence of the first signal and the subsequent occurrence of the second signal and said control means includes means for providing count pulses by dividing said reference pulses provided at said frequency of F times said first frequency by $F/1-F$, where F is a number less than unity and said control means in response to said second signal selects the operation of said pulse producing means to provide said reference pulses at a frequency of F times said first frequency until the number of said count pulses produced is equal to said phase altering count, thereby providing said time interval.

25. The system according to claim 24 wherein said control means is a programmed microprocessor.

26. The system for phasing two motors according to claim 14 wherein the first signal represents the angular position of said stepping motor, said count is made between the occurrence of the second signal and the subsequent occurrence of the first signal and said control means includes means for providing count pulses by dividing said reference pulses provided at said frequency of F times said first frequency by $F/F-1$, where F is greater than unity and said control means in response to said first signal selects the operation of said pulse producing means to provide said reference pulses at a frequency of F times said first frequency until the number of said count pulses produced is equal to said phase altering count, thereby providing said time interval.

27. The system according to claim 26 wherein said control means is a programmed microprocessor.

28. The system for altering the phase difference between two motors according to claim 19 wherein the first signal represents the angular position of said stepping motor, said count is made between the occurrence of the first signal and the subsequent occurrence of the second signal and said control means includes means for providing count pulses by dividing said reference pulses provided at said frequency of F times said first frequency by $F/1-F$, where F is less than unity and said control means in response to said second signal selects the operation of said pulse pg,40 producing means to provide said reference pulses at a frequency of F times said first frequency until the number of said count pulses produced is equal to said phase altering count, thereby providing said time interval.

29. The system according to claim 28 wherein said control means is a programmed microprocessor.

30. The system for phasing two motors according to claim 19 wherein the first signal represents the angular position of said stepping motor, said count is made between the occurrence of the second signal and the subsequent occurrence of the first signal and said control means includes means for providing count pulses by dividing said reference pulses provided at said first frequency by $F/F-1$, where F is greater than unity and said control means in response to said first signal selects the operation of said pulse producing means to provide said reference pulses at a frequency of F times said first frequency until the number of count pulses produced is equal to said phase altering count, thereby providing said time interval.

31. The system according to claim 30 wherein said control means is a programmed microprocessor.

* * * * *